United States Patent
Duguay et al.

(10) Patent No.: US 6,694,360 B1
(45) Date of Patent: Feb. 17, 2004

(54) MULTI-MODE NETWORK INTERFACE HAVING LOADABLE SOFTWARE IMAGES

(75) Inventors: Christopher J. Duguay, Winchendon, MA (US); Heidi R. Pickreign, Harvard, MA (US); Patricia C. Cross, Westborough, MA (US); Laxminarayan Krishnamurthy, Acton, MA (US)

(73) Assignee: 3Com Corporation, Santa Clara, CA (US)

( * ) Notice: Subject to any disclaimer, the term of this patent is extended or adjusted under 35 U.S.C. 154(b) by 679 days.

(21) Appl. No.: 09/591,568

(22) Filed: Jun. 9, 2000

(51) Int. Cl.[7] .................................... G06F 15/177
(52) U.S. Cl. ........................ 709/220; 709/317
(58) Field of Search ........................ 709/220–225, 709/317, 202

(56) References Cited

U.S. PATENT DOCUMENTS

| | | | | |
|---|---|---|---|---|
| 5,764,726 A | * | 6/1998 | Selig et al. | 379/21 |
| 5,966,428 A | * | 10/1999 | Ortiz Perez et al. | 379/27.02 |
| 6,029,175 A | * | 2/2000 | Chow et al. | 707/104.1 |
| 6,041,041 A | * | 3/2000 | Ramanathan et al. | 370/241 |
| 6,240,534 B1 | * | 5/2001 | Nakane | 714/55 |
| 6,282,582 B1 | * | 8/2001 | Oshima et al. | 709/317 |
| 6,480,972 B1 | * | 11/2002 | Cromer et al. | 714/25 |
| 6,539,338 B1 | * | 3/2003 | Pickreign et al. | 702/185 |
| 6,564,371 B1 | * | 5/2003 | Goldman et al. | 717/127 |

* cited by examiner

*Primary Examiner*—Kristine Kincaid
*Assistant Examiner*—Sindya Narayanaswamy
(74) *Attorney, Agent, or Firm*—Weingarten, Schurgin, Gagnebin & Lebovici LLP

(57) ABSTRACT

A multi-mode network interface adapter includes a diagnostic mode, a sleep mode and a run-time mode. The network adapter enters the diagnostic mode at least in response to a power-up signal and validates the operation of predetermined network adapter functions. In the sleep mode, the network adapter transmits messages onto the network and responds to messages received from the network that would otherwise be handled by a host computer operating system. In this mode, the network adapter creates the appearance to other devices that the host computer is operational even if the host computer has entered a reduced power state in which the host computer operating system is not operational. In the run-time mode, the network adapter passes messages received from the network to the host computer and transmits messages received from the host computer over the network.

12 Claims, 6 Drawing Sheets

MULTI-MODE NETWORK INTERFACE HAVING LOADABLE SOFTWARE IMAGES

CROSS REFERENCE TO RELATED APPLICATIONS

N/A

STATEMENT REGARDING FEDERALLY SPONSORED RESEARCH OR DEVELOPMENT

N/A

BACKGROUND OF THE INVENTION

The present invention relates to network interface adapters for coupling a host computer to a computer network, and more specifically to a multi-mode network interface adapter that is capable of operating in at least a diagnostic mode, a sleep mode, and a run-time mode.

The connection of computers to computer networks to facilitate the exchange of information between and among client computers and servers coupled to the networks has become commonplace. A host computer is typically communicably coupled to a network via a device commonly referred to as a network interface adapter, which may comprise logic disposed on a motherboard with host logic or alternatively disposed on a network interface card that may be electrically coupled to the host computer via mating connectors.

The ability to detect errors and maintain the operability of network interface adapters cannot be over emphasized where computers are routinely requested by users to access information and communicate with other users over a network. Accordingly, the ability to detect problems within a network interface adapter and to maintain the operability of the network interface adapter over a variety of operational conditions is extremely important in various business and commercial environments.

Moreover, the ability of computers to conserve or otherwise manage the power that they consume has become increasingly important. In a typical power management scheme, a computer or at least a certain number of components incorporated therein is powered-down when the computer is not in use for an extended time. A computer or sub-system in this condition may be referred to as operating in a "low-power state" or a "host operating system absent state." Full power is then restored to the computer when it is required for use. A computer in this alternate condition may be referred to as operating in a "full-power state" or a "host operating system present state."

Although such power management schemes have enhanced the energy efficiency of computers, current power management techniques have drawbacks in that they are not easily adapted for use in network computing systems. For example, a computer connected to a network typically monitors the network for data packets. If the computer detects a data packet, then it generally either rejects the data packet or accepts and processes the data packet. However, if the computer implements a power management application that causes it to enter the low-power state after a period of non-use, then that computer in the low-power state may be incapable of monitoring the network for data packets. As a result, data packets that are addressed to that computer may go undetected and be inadvertently lost.

Not only may data packets be inadvertently lost on the network, but a computer in the low-power state may also lose its communications link to the network. For example, such a computer may be incapable of renewing the lease of its IP address within the lease period. As a result, that computer may inadvertently lose both its current IP address and its communications link to the network.

It would therefore be desirable to have a network interface adapter that includes self-diagnostic capability, the ability to support network functions even if the host computer is in the host operating system absent state, and to provide typical network functions when the host is operational and operating in the host operating system present state.

BRIEF SUMMARY OF THE INVENTION

In accordance with the present invention, a network adapter is described that is operational in at least three modes. In a first mode of operation, the network adapter executes diagnostic software routines to determine whether predetermined functions associated with the network adapter are operational. Status information is reported to the host processor as a consequence of the execution of the self-diagnostic routines. In a second mode of operation, the network adapter responds to network messages and transmits messages onto the network in response to a signal from the host processor indicating that the host processor is entering the host operating system absent state. In a third mode of operation, the network adapter provides normal run-time functions and passes messages received by the network adapter over the network to the host processor and transmits messages received from the host processor over the network in accordance with the applicable transfer protocols. In a fourth mode of operation, the network adapter executes additional diagnostic software routines to determine whether predetermined functions relating to the interoperability of the network adapter and a host computer communicably coupled thereto are operational.

Other features, functions, and aspects of the invention will be evident from the detailed description of the invention that follows.

BRIEF DESCRIPTION OF THE SEVERAL VIEWS OF THE DRAWING

The invention will be more fully understood with reference to the following detailed description of the invention in conjunction with the drawings of which.

DETAILED DESCRIPTION OF THE INVENTION

In accordance with the present invention, a system is described that includes a multi-mode network interface adapter for coupling a host computer to a network. In a first mode of operation, referred to herein as the "self-diagnostic mode," the network adapter is operative to execute diagnostic functions out of a diagnostic software image to test predetermined aspects of the network adapter. In a second mode of operation, referred to herein as the "sleep mode,"

the network adapter is operative to execute sleep mode functions out of a sleep mode software image. In this second mode of operation, the network adapter maintains the appearance to devices communicating with the host computer over the network that the host computer is fully functional, even if the host computer has entered a reduced power state in which the host Operating System (OS) is not functional ("the host OS absent state"). In a third mode of operation, referred to herein as the "run-time mode," the network adapter passes messages received from the network to the host computer and transmits messages from the host computer onto the network via the network adapter.

Figure 1:
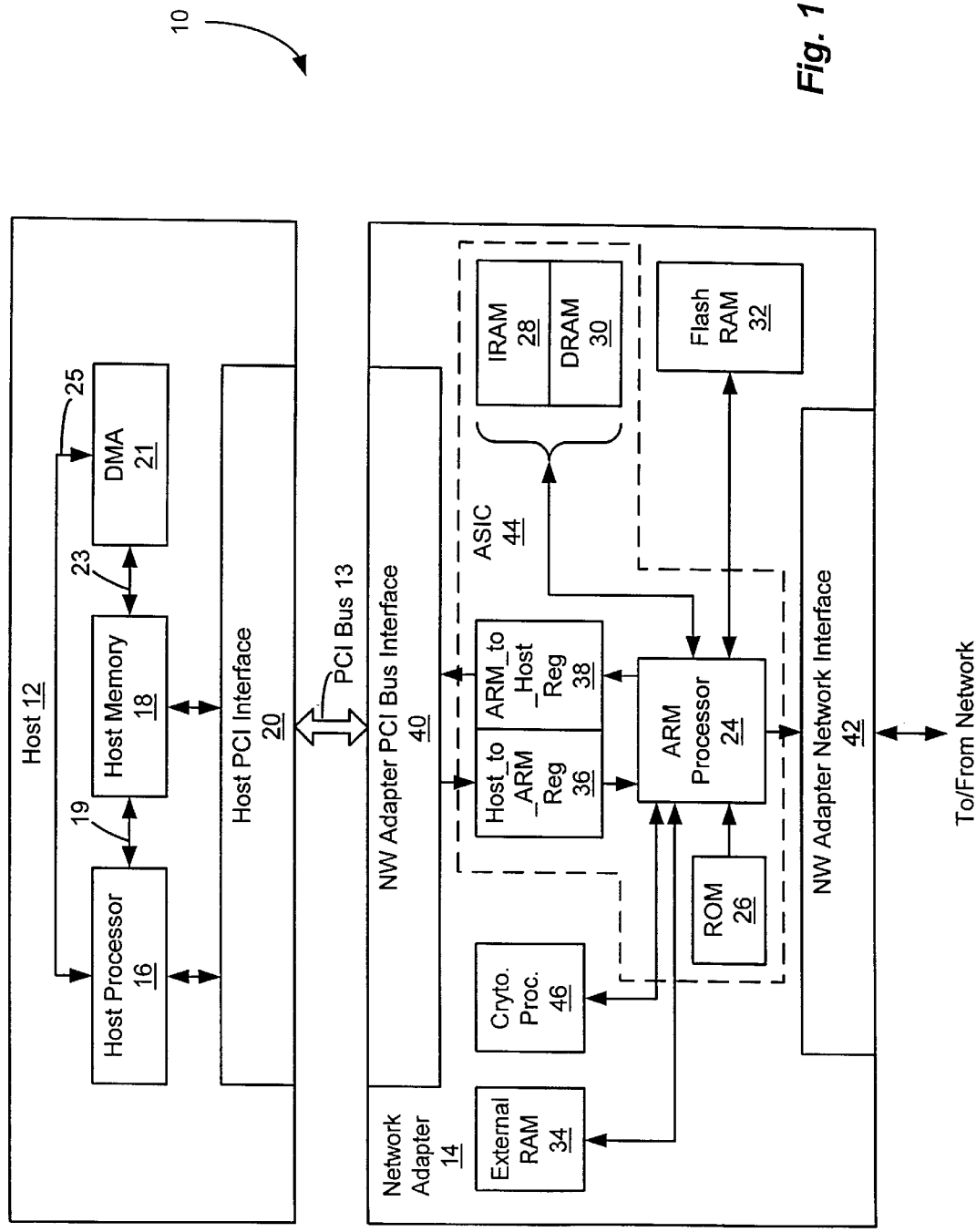
FIG. 1 is block diagram of a system incorporating a multi-mode network adapter operative in a manner according to the present invention.

FIG. 1 depicts an illustrative embodiment of a network computing system 10 that is operative in a manner according to the present invention. As depicted in FIG. 1, the network computing system 10 includes a host computer 12 that is coupled to a network interface adapter 14 via a Peripheral Component Interconnect (PCI) local bus 13. The host computer 12 includes a host processor 16 that is communicably coupled to a host memory 18 via a memory bus 19. Further, the host processor 16 is coupled to a host PCI bus interface 20 that communicates over the PCI bus 13 with a network adapter PCI bus interface 40 included within the network adapter 14.

The network computing system 10 further includes a direct-memory access (DMA) controller 21 that is communicably coupled to the host memory 18 via a memory bus 23 and to the host processor 16 via a system bus 25 to provide for the direct transfer of software images from the host memory 18 to the network adapter 14.

The network adapter 12 includes a network adapter processor 24 that is communicably coupled to a Read Only Memory (ROM) 26, an Instruction Random Access Memory (IRAM) 28, a Data Random Access Memory (DRAM) 30, an external RAM 34, and a flash RAM 32. While any suitable processor may be employed in the presently described system 10, in a preferred embodiment, the network adapter processor 24 comprises an ARM processor that is fabricated as a core element of an Application Specific Integrated Circuit (ASIC) 44. The ROM 26, the IRAM 28, and the DRAM 30 are also preferably fabricated as integral parts of the ASIC 44.

The network adapter 14 further includes a network adapter PCI bus interface 40. For example, information may be transferred between the host PCI bus interface 20 and the network adapter PCI bus interface 40 via Host_to_ARM registers 36 and ARM_to_Host registers 38 included in the network adapter 14, as discussed in greater detail below.

Specifically, the Host_to_ARM registers 36 and the ARM_to_Host registers 38 are general-purpose registers that are interfaced to the PCI bus 13. Information may be written via the network adapter PCI bus interface 40 into the Host_to_ARM registers 36 by the host processor 16 and read by the network adapter processor 24; and, information may be written into the ARM_to_Host registers 38 by the network adapter processor 24 and read by the host processor 16 via the network adapter PCI bus interface 40. In a preferred embodiment, the Host_to_ARM registers 36 and the ARM_to_Host registers 38 are fabricated as integral parts of the ASIC 44.

Moreover, the network adapter 14 includes a cryptographic processor 46 that is coupled to the network adapter processor 24 and which supports cryptographic functions; and, a Media Access Control (MAC) network interface 42, e.g., an Ethernet 10/100 compatible interface, to allow attachment of the host computer 12 to a network via the network adapter 14.

As described above, the ASIC 44 preferably comprises the network adapter processor 24, the ROM 26, the IRAM 28, the DRAM 30, the Host_to_ARM registers 36, and the ARM_to_Host registers 38. In this illustrative embodiment, the flash RAM 32, the external RAM 34, and the cryptographic processor 46 are outboard of the ASIC 44.

The network adapter 14 has at least three (3) modes of operation, particularly, the self-diagnostic mode, the sleep mode, and the run-time mode. In this illustrative embodiment, when the network adapter 14 is in the self-diagnostic mode, the network adapter 14 is operative to execute "self-diagnostic" functions including functions for testing the IRAM 28, the DRAM 30, and the flash RAM 32. The self-diagnostic functions are further described in U.S. patent application Ser. No. 09/591,045, filed Jun. 9, 2000, entitled Self-Diagnostic Testing of a Network Interface Adapter, co-filed with the present application and assigned to the assignee of the present application, which is incorporated herein by reference. In a fourth "host-diagnostic mode," the network adapter processor 24 and the host processor 16 are operative to execute "host-diagnostic" functions including functions for testing the ability of the network computing system 10 to transmit messages over the network, and for testing the interoperability of the host computer 12 and the network adapter 14 using the Host_to_ARM registers 36 and the ARM_to_Host registers 38. For example, the ARM_to_Host registers 38 may be used by the ARM processor 24 to initialize test conditions on the host computer 12, and the Host_to_ARM registers 36 may be used by the ARM processor 24 to receive confirmations of test results from the host computer 12.

Moreover, in this illustrative embodiment, when the network adapter 14 is in the sleep mode, the network adapter 14 is operative to execute sleep mode functions. The sleep mode functions include periodically broadcasting a defined data packet type, e.g., a "machine address refresh frame," over the network to prevent a network switch/router from removing the machine address/IP address pair of the network computing system 10 from its network table. As a result, the network switch/router is capable of transmitting data packets received from other computers on the network to the network computing system 10, even if the host computer 12 is in the host OS absent state.

The sleep mode functions further include receiving and responding to "ARP request messages" and "echo request messages" when the host computer 12 is in the host OS absent state; directing the host computer 12 to make a transition from the host OS absent state to a host OS present state either at the end of a predetermined time interval or at a predetermined time; transmitting a reply frame in response to a poll frame in a NOVELL™ client-server computing system configuration (NOVELL™ is a trademark of Novell, Inc., Provo, Utah, USA) when, the host computer 12 is in the host OS absent state; and, renewing the IP address lease of the host computer 12 when the host computer 12 is in the host OS absent state. The sleep mode functions are further described in U.S. patent application Ser. No. 09/591,579, filed Jun. 9, 2000, entitled System and Method For Operating a Network Adapter When an Associated Network Computing System is in a Low-Power State, co-filed with the present application and assigned to the assignee of the present application, which is incorporated herein by reference.

In a preferred embodiment, the self-diagnostic functions are executed in response to a power-up condition within the network adapter 14, or alternatively in response to a reset signal transmitted by the host computer 12 to the network adapter 14. Accordingly, the flash RAM 32 is preferably programmed with the self-diagnostic software image for loading from the flash RAM 32 to the IRAM 28 at power-up or in response to the receipt of the reset signal. In contrast, the host-diagnostic functions are executed on-demand by the user of the network computing system 10 to conserve storage requirements on the network adapter 14. The host-diagnostic software image is preferably stored in secondary storage associated with the host computer 12 along with the run-time software image and is downloaded to the IRAM 28, the DRAM 30, or other executable network adapter RAM, as applicable.

When the network adapter 14 is in the sleep mode, the network adapter 14 is operative to execute the sleep mode functions out of the sleep mode software image. Because the network adapter 14 in the sleep mode has sufficient circuitry powered to maintain the operation of the network adapter 14, the flash RAM 32 is preferably programmed with the sleep mode software image to enable the network adapter 14 to load the sleep mode software image from the flash RAM 32 to the IRAM 28, e.g., following the execution of the self-diagnostic functions and subsequently upon an indication that the host computer 12 is entering the host OS absent state.

Figure 2:
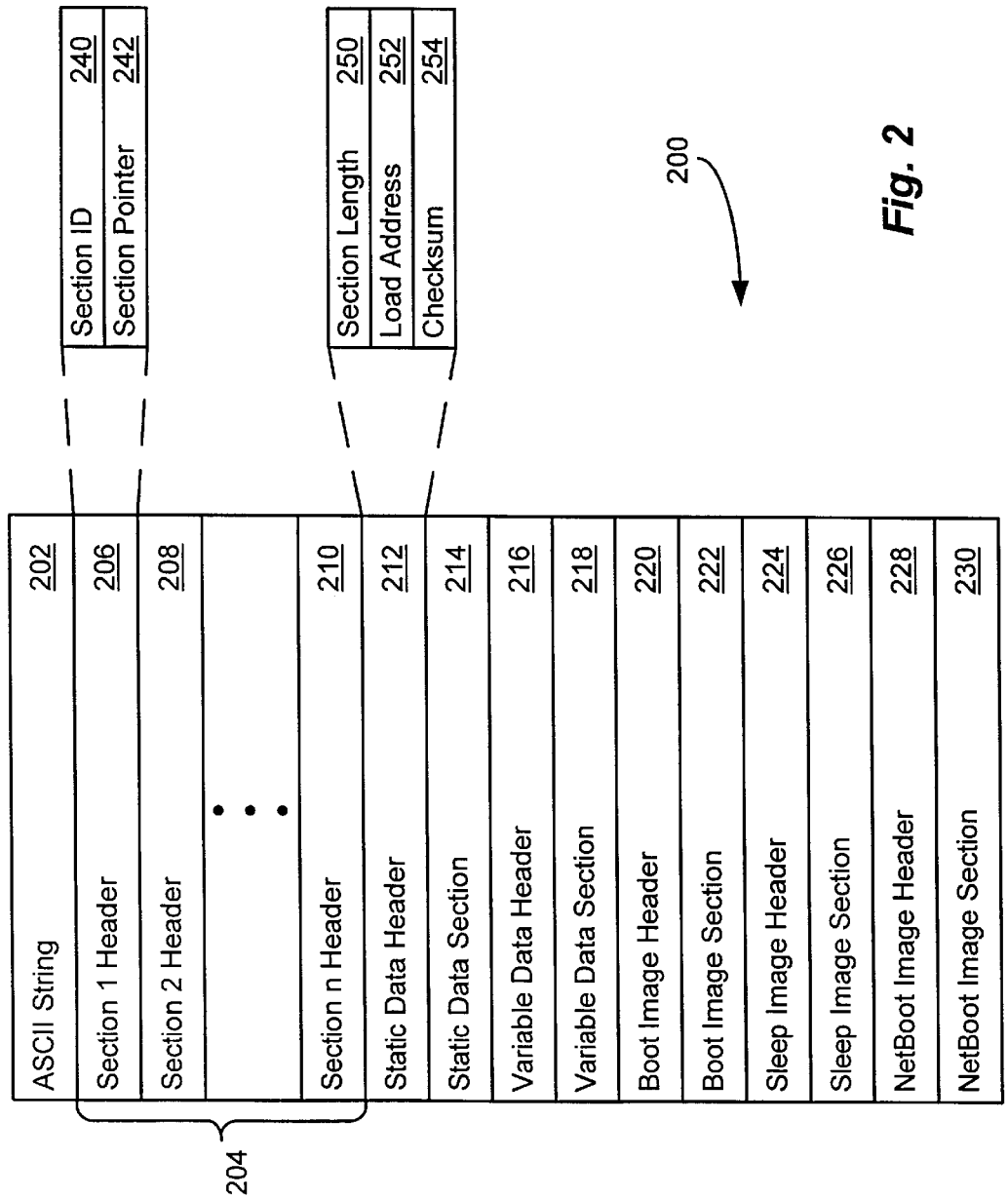
FIG. 2 is a diagram of a memory layout for a flash RAM included in the multi-mode network adapter of FIG. 1.

FIG. 2 depicts an illustrative embodiment of a memory layout 200 for the flash RAM 32. In a preferred embodiment, the flash RAM 32 is a non-volatile, 1 Mb, serial flash RAM device that is programmed using conventional techniques before being installed in the network adapter 14. Further, in this illustrative embodiment, the self-diagnostic software image is contained on the flash RAM 32 within a boot image section 222; and, the sleep mode software image is contained on the flash RAM 32 within a sleep image section 226.

Like conventional flash memory devices, the flash RAM 32 is divided into pages. Further, an entire page is read or written at the same time when accessing or storing information on the flash RAM 32. Accordingly, FIG. 2 depicts a predetermined ASCII string identifier 202, which in this illustrative embodiment is contained on a first page, i.e., page 0, of the flash RAM 32. The ASCII string 202 is a validation identifier that the network adapter processor 24 can access to determine whether or not the flash RAM 32 has been programmed. For example, the ASCII string 202 may comprise the first eight (8) bytes of page 0 of the flash RAM 32.

A plurality of section headers 204, which includes a section 1 header 206 through a section n header 210, follows the ASCII string 202. For example, the plurality of section headers 204 may be programmed either on page 0 following the ASCII string 202 or on page 1 of the flash RAM 32. Alternatively, each section header 206 through 210 may be programmed on successive, respective pages immediately following page 0 of the flash RAM 32.

The plurality of section headers 204 includes information relating to respective sections programmed on subsequent pages of the flash RAM 32. As depicted in FIG. 2, the section 1 header 206 includes a section ID 240 and a section pointer 242. Further, the section 2 header 208 through the section n header 210 similarly include respective section IDs and respective section pointers.

Specifically, in this illustrative embodiment, each section ID, e.g., the section ID 240, comprises a one (1) byte identifier for identifying a section such as a static data section 214, a variable data section 218, a boot image section 222, a sleep image section 226, and a NetBoot image section 230. In this illustrative embodiment, the static data section 214 holds at least the MAC address of the network adapter 14; the variable data section 218 holds at least a plurality of configuration parameters; the boot image section 222 includes the self-diagnostic software image; the sleep image section 226 includes the sleep mode software image; and, the NetBoot image section 230 includes the conventional LanWorks BootWare® software image (BootWare® is a registered trademark of 3Com Corporation, Marlborough, Mass., USA) for booting the connection between the network adapter 14 and the network. In one embodiment, the variable data section 218 comprises two (2) variable data sections, wherein a first variable data section holds at least the plurality of configuration parameters and a second variable data section holds at least a plurality of factory default configuration parameters.

As explained above, an entire page must be read or written at the same time when accessing or storing data on the flash RAM 32. Accordingly, each section pointer, e.g., the section pointer 242, comprises a data element containing a page location of one of the above-mentioned sections in the flash RAM 32.

For example, in one embodiment, the plurality of section headers 204 may be programmed on page 0 following the ASCII string 202. Accordingly, the data element of the section pointer 242 for the section 1 header 206 may contain the location of page 1 including the static data section 214; the data element of a section pointer for the section 2 header 208 may contain the location of page 2 including the variable data section 218; the data element of a section pointer for a section 3 header may contain the location of page 3 including the boot image section 222; the data element of a section pointer for a section 4 header may contain the location of page 4 including the sleep image section 226; and, the data element of a section pointer for a section 5 header may contain the location of page 5 including the NetBoot image section 230.

Specifically, in this illustrative embodiment, each section identified by a section ID has a corresponding header. For example, a static data header 212 corresponds to the static data section 214; a variable data header 216 corresponds to the variable data section 218; a boot image header 220 corresponds to the boot image section 222; a sleep image header 224 corresponds to the sleep image section 226; and, a NetBoot image header 228 corresponds to the NetBoot image section 230. Accordingly, the data element of each section pointer contains a page location of one of the above-mentioned sections and its corresponding header in the flash RAM 32.

Those of ordinary skill in the art will appreciate that each of the respective header and section pairs, e.g., the static data header 212 and the static data section 214, may alternatively be programmed on a plurality of successive pages in the flash RAM 32. In this alternative embodiment, the data element of each section pointer contains the location of the first page of the plurality of successive pages containing the respective header/section pair in the flash RAM 32.

As depicted in FIG. 2, the static data header 212 includes a section length 250, a load address 252, and a checksum 254. Further, the variable data header 216, the boot image header 220, the sleep image header 224, and the NetBoot image header 228 similarly include respective section lengths, respective load addresses, and respective checksums.

Specifically, the section length 250 comprises an indication of the length of the static data section 214. For example, the length of a particular section in the flash RAM 32 may be expressed as a number of bytes or words. Further, the load address 252 comprises an indication of the location in the DRAM 30 where the static data is to be loaded before the user boots the network computing system 10. Similarly, the load address of the variable data header 216 indicates the location in the DRAM 30 where the variable data is to be loaded. It should be noted, however, that the load addresses of the boot image header 220, the sleep image header 224, and the NetBoot image header 228 indicate the locations in the IRAM 28, the DRAM 30, or the external RAM 34, where the respective software images are to be loaded before the user boots the network computing system 10.

Moreover, the checksums such as the checksum 254 are used to detect errors in the loading of the static data, the variable data, the boot image, the sleep image, and the NetBoot image into the IRAM 28 or the DRAM 30. In a preferred embodiment, the checksums are conventional Cyclical Redundancy Check (CRC) values.

As mentioned above, the run-time software image is stored in secondary storage accessible by the host computer 12 for subsequent downloading from the host computer 12 to the network adapter 14. Accordingly, FIG. 3 depicts an exemplary file format 300 for the run-time software image stored in the host memory 18.

Figure 3:
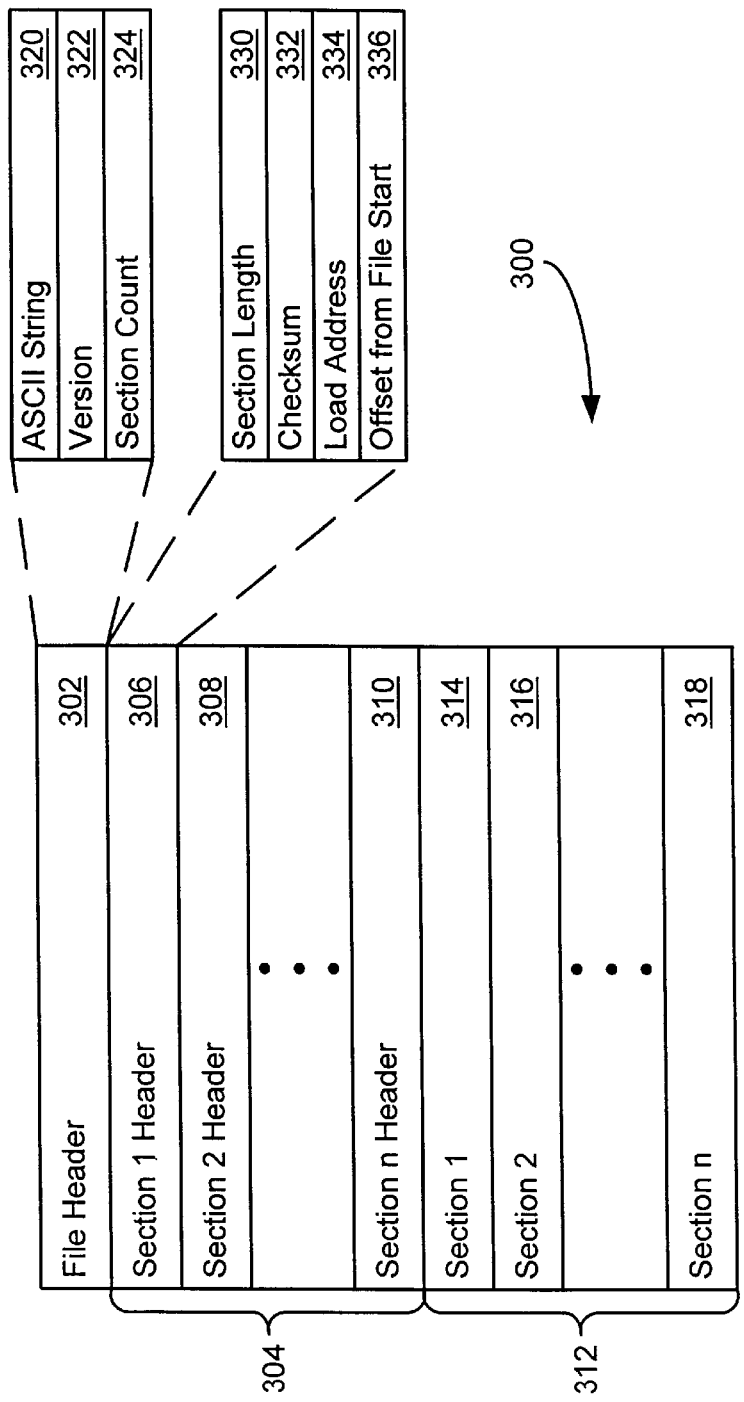
FIG. 3 is a diagram of a file format for a run-time software image executed by the multi-mode network adapter of FIG. 1; and FIG. 4a through FIG. 4c is a flow diagram of a method of operation of the multi-mode network adapter of FIG. 1.

Specifically, FIG. 3 depicts a file header 302 at the beginning of the run-time file format 300. In this illustrative embodiment, the file header 302 includes a predetermined ASCII string identifier 320, a version indicator 322, and a section count indicator 324. For example, the ASCII string identifier 320 may have the same format as the ASCII string identifier 202 of the memory layout 200 (see FIG. 2) for the flash RAM 32; the version 322 may comprise a version number for the run-time software image; and, the section count 324 may indicate a number of sections included in the run-time software image.

A plurality of section headers 304, which includes a section 1 header 306 through a section n header 310, follows the file header 302. Specifically, the plurality of section headers 304 includes information relating to respective sections included in the run-time file format 300. As depicted in FIG. 3, the section 1 header 306 includes a section length 330, a checksum 332, a load address 334, and an offset indication 336 from the start of the file. The section 2 header 308 through the section n header 310 similarly include respective section lengths, respective checksums, respective load addresses, and respective offset indications.

More specifically, the section length 330, which is included in the section 1 header 306, comprises an indication of the length of a corresponding section 1 314. The length of a particular section in the run-time software image file may be expressed as a number of bytes or words. Further, the checksum 332 is a character used to detect errors in the downloading of the run-time software image from the host memory 18 to the network adapter 14. In a preferred embodiment, the checksums included in the run-time software image file are conventional CRC characters.

Still further, the load address 334 comprises an indication of the location in the IRAM 28, the DRAM 30, or the external RAM 34, where the portion of the run-time software image stored in the section 1 314 is to be loaded; and, the offset from file start 336 comprises an indication of the linear displacement of the location of the section 1 314 relative to the beginning of the run-time software image file. Moreover, the section 1 header 306 corresponds to the section 1 314; the section 2 header 308 corresponds to a section 2 316; and, the section n header 310 corresponds to a section n 318. The section 1 314 through the section n 318 hold respective portions of the run-time software image.

In a preferred embodiment, sections of zero (0) length are permitted in the run-time file format 300. Further, the load address 334 preferably indicates the starting address of the run-time software image in the IRAM 28, the DRAM 30, or the external RAM 34, as applicable. Accordingly, the order of the sections 1 through n of the run-time file format 300 is preferably preserved when downloading the run-time software image from the host memory 18 to the IRAM 28.

The embodiments disclosed herein will be better understood with reference to the following illustrative examples. In a first illustrative example, the static data, the variable data, the self-diagnostic software image, the sleep mode software image, and the BootWare® software image are loaded from the flash RAM 32 to the IRAM 28 or the DRAM of the network adapter 14 before the user boots the network computing system 10.

Specifically, the ARM processor 24 executes a program stored in the ROM 26 for booting the network adapter 14 and controlling the loading of the images and data from the flash RAM 32 to the IRAM 28, the DRAM 30, and the external RAM 34, respectively, of the ASIC 44. In this illustrative example, the ARM processor 24 performs a conventional register-based load of the software images and data from the flash RAM 32 to the IRAM 28 and the DRAM 30, respectively.

Accordingly, the ARM processor 24 executing the program stored in the ROM 26 reads the predetermined ASCII string identifier 202 on page 0 of the flash RAM 32 to validate the flash RAM 32. Next, if the flash RAM 32 has been successfully validated, then the ARM processor 24 reads the section ID 240 and the section pointer 242 included in the section 1 header 206 to identify the page location of the static data header 212 and the static data section 214, in accordance with the memory layout 200 (see FIG. 2). The ARM processor 24 then goes to that page location of the flash RAM 32 to read the section length 250, the load address 252, and the checksum 254 included in the static data header 212. Next, the ARM processor 24 executes the conventional register-based loading technique to load the amount of static data indicated by the section length 250 from the flash RAM 32 to the DRAM 30, starting at the location in the DRAM 30 indicated by the load address 252. The ARM processor 24 then performs a CRC check on the loaded static data to generate a checksum, and compares the generated checksum with the checksum 254 to detect any errors that may have occurred when loading the static data from the flash RAM 32 to the DRAM 30.

The ARM processor 24 loads the variable data from the flash RAM 32 to the DRAM 30; and, loads the self-diagnostic software image, the sleep mode software image, and the BootWare® software image from the flash RAM 32 to the IRAM 28 in a manner similar to that described above in the first illustrative example.

In a second illustrative example, the run-time software image is downloaded from the host memory 18 to the IRAM 28.

Specifically, the host processor 16 and the ARM processor 24 cooperate to execute a program for controlling the loading of the run-time software image and/or the host-diagnostic software image from the host memory 18 to the IRAM 28. In this second illustrative example, the host processor 16 and the ARM processor 24 perform a register-based DMA download of the software images from the host memory 18 to the IRAM 28. It should be understood that at least a portion of the software images may alternatively be downloaded to the DRAM or the external RAM 34.

Accordingly, after the ARM processor 24 controls the loading of the static and variable data and the self-diagnostic, sleep mode, and BootWare® software images from the flash RAM 32 to the DRAM 30 and IRAM 28, respectively, the host processor 16 monitors the ARM_to_Host registers 38 to detect a STATUS_WAITING_FOR_HOST_REQUEST status indication. The STATUS_WAITING_FOR_HOST_REQUEST status indication indicates that the ARM processor 24 has completed the loading of the above-mentioned data and software images from the flash RAM 32 to the IRAM 28 and the DRAM 30, respectively; and, that the ARM processor 24 is now waiting for a request from the host processor 16 to start the register-based DMA download. Upon detection of the STATUS_WAITING_FOR_HOST_REQUEST status indication, the host processor 16 loads a HOST_CMD_RUNTIME_IMAGE command in one of the Host_to_ARM registers 36 to request that the register-based DMA download of the run-time and/or host-diagnostic software images begin.

As described above, the Host_to_ARM registers 36 and the ARM_to_Host registers 38 are general-purpose registers compatible with the PCI bus 13. In this illustrative example, the Host_to_ARM registers 36 are 32-bits wide by 8-words long; and, the ARM_to_Host registers 38 are 32-bits wide by 4-words long. For example, a STATUS_WAITING_FOR_HOST_REQUEST status indication value may be loaded in a first 32-bit wide register of the ARM_to_Host registers 38; and, a HOST_CMD_RUNTIME_IMAGE command value may be loaded in a first 32-bit wide register of the Host_to_ARM registers 36.

The ARM processor 24 monitors the Host_to_ARM registers 36 to detect the HOST_CMD_RUNTIME_IMAGE command. Upon detection of the HOST_CMD_RUNTIME_IMAGE command, the ARM processor 24 loads a STATUS_WAITING_FOR_SEGMENT status indication in one of the ARM_to_Host registers 38 to inform the host processor 16 that it is ready to start the register-base DMA download procedure for a first segment of the run-time and/or host-diagnostic software image.

Accordingly, the host processor 16 monitors the ARM_to_Host registers 38 to detect the STATUS_WAITING_FOR_SEGMENT status indication. Upon detection of the STATUS_WAITING_FOR_SEGMENT status indication, the host processor 16 loads the Host_to_ARM registers 36 with information for downloading the first segment of the run-time and/or host-diagnostic software image.

In this illustrative example, the host processor 16 loads the first six (6) 32-bit registers of the Host_to_ARM registers 36 with the following information: register 1 is loaded with a HOST_CMD_SEGMENT_AVAILABLE command to inform the ARM processor 24 that the first segment is available for downloading; register 2 is loaded with an indication of the length in bytes or words of the first segment; register 3 is loaded with a checksum for the segment; register 4 is loaded with an indication of the location in the IRAM 28 where the first word of the first segment is to be loaded; register 5 is loaded with the upper 32-bits of the address in the host memory 18 where the first word of the run-time and/or host-diagnostic software image is currently stored; and, register 6 is loaded with the lower 32-bits of the address in the host memory 18 where the first word of the run-time and/or host-diagnostic software image is currently stored. In a preferred embodiment, the 64-bit address loaded in registers and 6 of the Host_to_ARM registers 36 is memory-mapped in PCI space.

The ARM processor 24 monitors the Host_to_ARM registers 36 to detect the above-described information relating to the first segment. Upon detection of the first segment information, the ARM processor 24 communicates with the DMA 21 to perform the direct transfer of the first segment of the run-time and/or host-diagnostic software images from the host memory 18 to the IRAM 28 using conventional DMA data transfer techniques.

At the completion of the transfer of the first segment, the ARM processor 24 performs a CRC check on the transferred first segment data to generate a checksum, and compares the generated checksum with the checksum for the first segment to detect any errors that may have occurred during the DMA data transfer procedure. If the comparison detects no errors, then the ARM processor 24 loads the STATUS_WAITING_FOR_SEGMENT status indication in one of the ARM_to_Host registers 38 to inform the host processor 16 that it is ready to start the register-base DMA download procedure for a next segment of the run-time and/or host-diagnostic software image.

After the run-time and/or host-diagnostic software images have been completely downloaded from the host memory 18 to the IRAM 28, the host processor 16 loads a HOST_CMD_DOWNLOAD_COMPLETE command in one of the Host_to_ARM registers 36 to inform the ARM processor 24 that the register-based DMA download of the run-time and/or host-diagnostic software images is completed.

The ARM processor 24 monitors the Host_to_ARM registers 36; and, upon detection of the HOST_CMD_DOWNLOAD_COMPLETE command, the ARM processor 24 loads a STATUS_WAITING_FOR_BOOT status indication in one of the ARM_to_Host registers 38 to inform the host processor 16 that the ARM processor 24 is ready to start a boot procedure for the network computing system 10. Accordingly, the host processor 16 monitors the ARM_to_Host registers 38; and, upon detection of the STATUS_WAITING_FOR_BOOT status indication, the host processor 16 starts executing a run-time boot procedure, e.g., by downloading a boot record.

In the event that a comparison of a generated checksum with a checksum for a software image segment indicates that an error has occurred during a DMA data transfer procedure, then the host processor 16 may alternatively download a software image from the host memory 18 to the IRAM 28 using the Host_to_ARM registers 36 and the ARM_to_Host registers 38.

Accordingly, in a third illustrative example, a software image, e.g., a diagnostic software image, is downloaded from the host memory 18 to the IRAM 28 using the Host_to_ARM registers 36 and the ARM_to_Host registers 38. It should be understood that this alternative download procedure does not utilize the DMA 21 included in the host computer 12. For example, a diagnostic software image including test vector images may be downloaded from the host computer 12 to the network adapter 14 in the manner of this third illustrative example to diagnose a problem encountered using the above-described DMA data transfer procedure.

In this third illustrative example, the host processor 16 and the ARM processor 24 cooperate to perform a register-based download of a software image from the host memory 18 to the IRAM 28. A characteristic of this register-based download procedure is that the host processor 16 and the ARM processor 24 exchange handshake signals via the Host_to_ARM and ARM_to_Host registers 36 and 38 to acknowledge and synchronize communication between the two processors 16 and 24.

In this illustrative example, the host processor 16 loads the first three (3) 32-bit registers of the Host_to_ARM registers 36 with the following information: register 1 is loaded with an address comprising an indication of the location in the IRAM 28 where a word of the software image is to be loaded; register 2 is loaded with the above-mentioned word; and, register 3 is loaded with a command, e.g., a HOST_CMD_WRITE_IMAGE command directing the ARM processor 24 to copy the word loaded in register 2 and to write that word at the specified address in the IRAM 28.

In a preferred embodiment, the 32-bit address loaded in register 1 of the Host_to_ARM registers 36 is memory-mapped in PCI space. Further, the read/write command loaded in register 2 of the Host_to_ARM registers 36 is preferably either a memory "peek" or a memory "poke" command.

The host processor 16 monitors the ARM_to_Host registers 38 to detect a STATUS_WRITE_ACKNOWLEDGE status indication. The STATUS_WRITE_ACKNOWLEDGE status indication indicates that the ARM processor 24 has completed the copying and writing of the word loaded in register 2 of the Host_to_ARM registers 36 to the specified address of the IRAM 28, and that the ARM processor 24 is now waiting for a next word to be written to the IRAM 28. In this way, the communication between the host processor 16 and the ARM processor 24 is acknowledged and synchronized.

Upon detection of the STATUS_WRITE_ACKNOWLEDGE status indication, the host processor 16 loads the Host_to_ARM registers 36 with an address, a data word, and a command for loading the next word from the host memory 18 to the IRAM 28. If that word is the last word of the software image, then upon detection of a next STATUS_WRITE_ACKNOWLEDGE status indication, the host processor 16 loads, e.g., register 1 of the Host_to_ARM registers 36 with an address comprising an indication of the location in the IRAM 28 at which the ARM processor 24 is to start executing the loaded software image, and loads, e.g., register 2 of the Host_to_ARM registers 36 with a HOST_CMD_EXECUTE_IMAGE command directing the ARM processor 24 to start executing the software image.

Figure 4A:
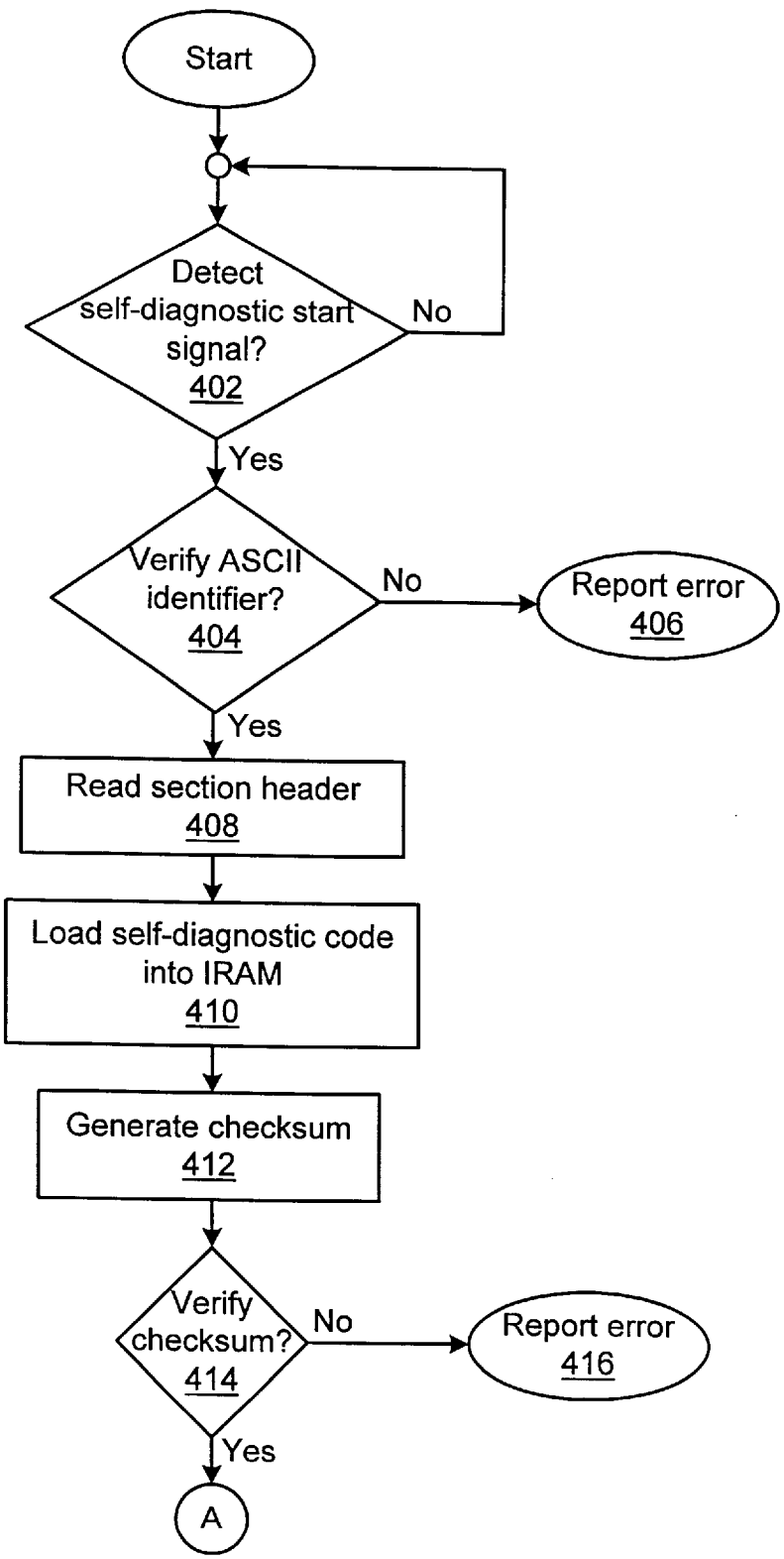
Figure 4B:
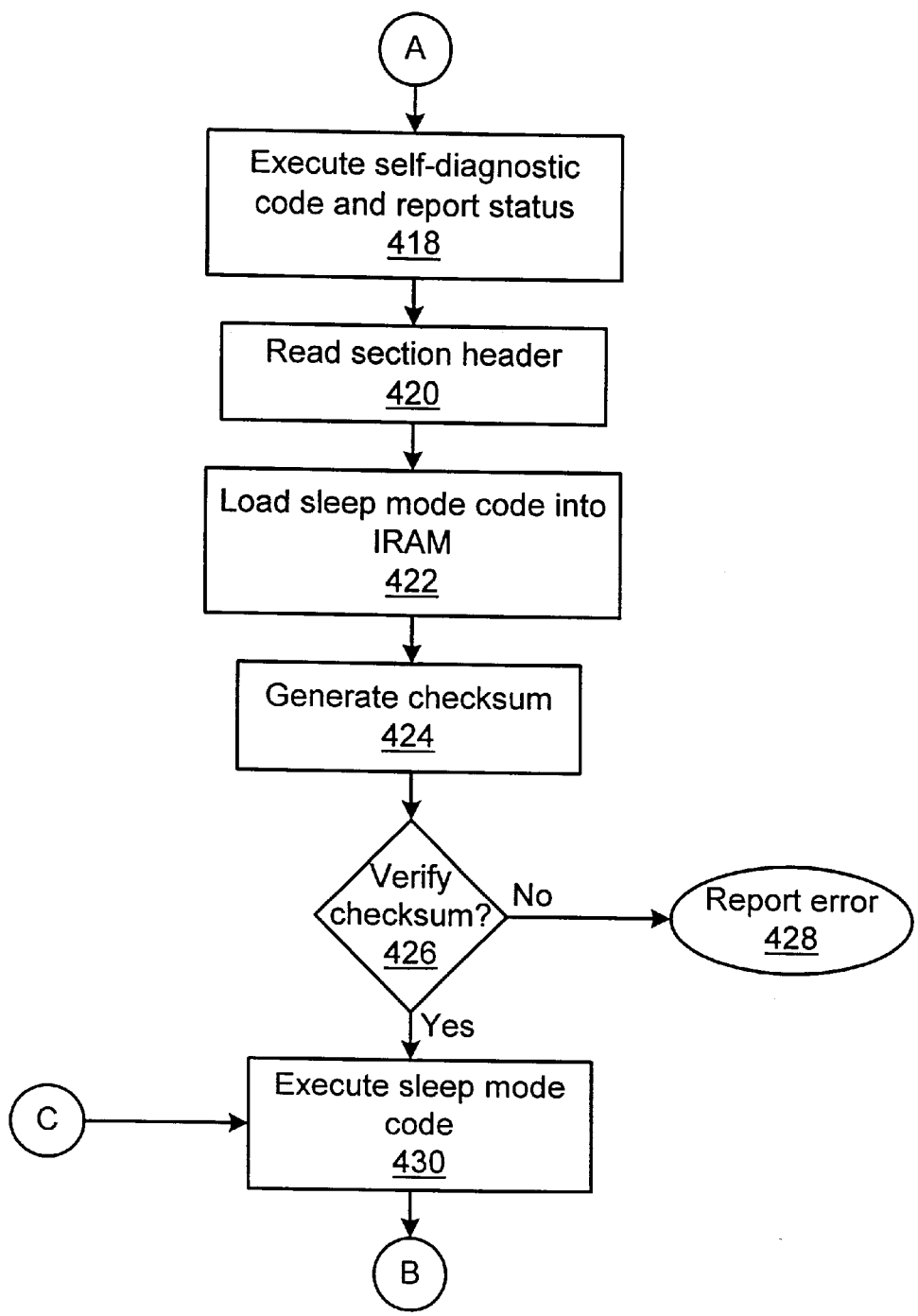
Figure 4C:
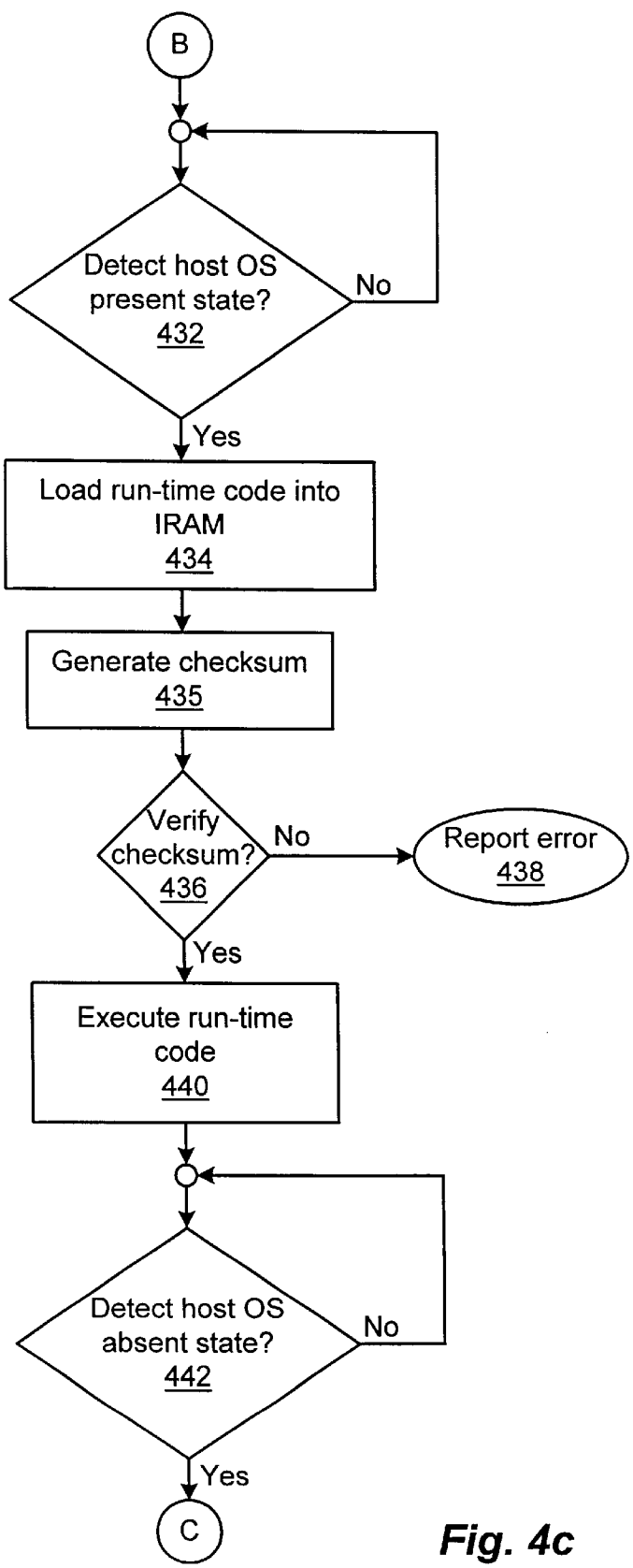

An illustrative method of operating the multi-mode network adapter 14 is illustrated by reference to FIG. 4a through FIG. 4c. In this illustrative method, it is assumed that the static data included in the static data section 214 (see FIG. 2) and the variable data included in the variable data section 218 (see FIG. 2) have already been loaded from the flash RAM 32 to the DRAM 30 and verified using respective CRC checksums in the manner described earlier in this specification.

First, a determination is made, as depicted in step 402 (see FIG. 4a), as to whether a self-diagnostic start signal has been detected at the network adapter processor 24. The self-diagnostic start signal may be generated by the network adapter processor 24 in response to a power-up condition, or alternatively in response to a reset signal transmitted by the host computer 12 to the network adapter 14. After detecting the self-diagnostic start signal, the network adapter processor 24 verifies, as depicted in step 404, that the first eight (8) bytes of page 0 within the flash RAM 32 contain the predetermined ASCII string identifier 202 (see FIG. 2) to determine whether or not the flash RAM 32 has been programmed. In the event it is determined that the flash RAM 32 has been programmed, then the flash RAM 32 will contain the predetermined ASCII string identifier 202; and, if the flash RAM 32 has not been programmed, then the flash RAM 32 will not contain the predetermined ASCII string identifier 202. If it is determined in step 404 that the flash RAM 32 does not contain the predetermined ASCII string identifier 202, then the network adapter processor 24 reports an error condition indicative of this fault to the host computer 12 via the ARM_to_Host registers 38, as depicted in step 406. If the network adapter processor 24 determines that the first eight (8) bytes of page 0 of the flash RAM 32 contains the predetermined ASCII string identifier 202, then the network adapter processor 24 reads, as depicted in step 408, the section 3 header, which follows the predetermined ASCII string identifier 202. The section 3 header comprises the section ID identifying the boot image code (i.e., the boot image header 220 and the boot image section 222; see FIG. 2) and the section pointer pointing to the first location within the flash RAM 32 where the boot image code is stored. The network adapter processor 24 then reads the boot image header 220 that includes, e.g., a four (4) byte section length, a four (4) byte load address, and a four (4) byte CRC checksum which comprise the first twelve (12) bytes of the boot image header 220. Next, the boot image code containing self-diagnostic code is loaded from the boot image section 222 of the flash RAM 32 to the IRAM 28, as depicted in step 410. The network adapter processor 24 then generates, as depicted in step 412, a CRC value for the loaded boot image code; and, verifies, as depicted in step 414, that the generated CRC value matches the CRC value contained within the boot image header 220. If the generated CRC value for the boot image code does not match the CRC value contained within the boot image header 220, then the network adapter processor 24 reports, as depicted in step 416, an error indicative of this fault to the host computer 12 via the ARM_to_Host registers 38. As depicted in step 418 (see FIG. 4b), the network adapter processor 24 executes the self-diagnostic code contained within the IRAM 28, and reports faults detected during the self-diagnostic process to the host computer 12 via the ARM_to_Host registers 38.

Next, the network adapter processor 24 reads, as depicted in step 420, the section 4 header, which comprises the section ID identifying the sleep image code (i.e., the sleep image header 224 and the sleep image section 226; see FIG. 2) and the section pointer pointing to the first location within the flash RAM 32 where the sleep image code is stored. The network adapter processor 24 then reads the sleep image header 224 including the section length, the load address, and the CRC checksum for the sleep image code. Next, the sleep image code is loaded from the sleep image section 226 of the flash RAM 32 to the IRAM 28, as depicted in step 422. The network adapter processor 24 then generates, as depicted in step 424, a CRC value for the loaded sleep image code; and, verifies, as depicted in step 426, that the generated CRC value matches the CRC value contained within the sleep image header 224. If the generated CRC value for the sleep image code does not match the CRC value contained within the sleep image header 224, then the network adapter processor 24 reports an error indicative of this fault to the host computer 12 via the ARM to Host registers 38, as depicted in step 428. After the sleep image code is loaded into the IRAM 28 for execution, the network adapter processor 24 initiates execution of the sleep image code, as depicted in step 430.

While executing the sleep image code, the network adapter 14 monitors the Host_to_ARM registers 36 for a signal indicative of the host OS present condition. This signal indicates that the host computer 12, which may have previously been in a low-power state in which the host OS was absent, has assumed a new state in which the host computer 12 is powered and the host OS is functional. This inquiry is depicted in step 432 (see FIG. 4c). In response to the detection of the host OS present condition, the run-time software image is loaded, as depicted in step 434, from the host memory 18 to the IRAM 28 contained within the network adapter 14. In a preferred embodiment, the run-time code image is downloaded from the host computer 12 using the above-described register-based DMA data transfer technique. As depicted in step 436, a determination is made as to whether the loaded run-time code is valid. Specifically, a CRC checksum is generated, as depicted in step 435, using the run-time code and compared to a CRC checksum value contained within a run-time image header. In the event that the generated checksum value does not match the CRC value contained within the run-time image header, an indication of this fault is reported to the host computer 12 by the network adapter processor 24, as depicted in step 438. In the event that the run-time code is validated by the network adapter processor 24, execution of the run-time code is initiated, as depicted in step 440. While executing the run-time code, the network adapter 14 forwards messages received at the network adapter interface 42 to the host computer 12, and transmits messages over the network from the network adapter interface 42 that are received from the host computer 12 at the network adapter PCI bus interface 40. In this run-time mode, the operation of the network adapter 14 is conventional. As depicted in step 442, the network adapter processor 24 monitors the Host_to_ARM registers 36 for an indication of the host OS absent condition. In the event the network adapter processor 24 detects a signal indicating that the host computer 12 is entering the host OS absent state, control passes to step 430 (see FIG. 4b) and the sleep mode code is executed as previously described.

In the above-described manner, the multi-mode network adapter 14 is provided for the network computing system 10. In the first mode of operation, referred to herein as the self-diagnostic mode, the network adapter processor 24 is operative to test predetermined functions of the network adapter 14 to verify that certain basic functions within the network adapter 14 are functional. In the second mode of operation, referred to herein as the sleep mode, the network adapter 14 responds to predetermined messages received over the network in lieu of the host processor 12 so as to create the appearance on the network that the host computer 12 is operational, even if the host computer 12 has entered the host OS absent state. For example, in this second mode, the network adapter 14 may periodically transmit a predetermined message over the network to avoid having the identity of the host computer 12 flushed from respective switch and router caches while the host computer 12 is in the reduced power or the host OS absent state. In the third mode of operation, referred to herein as the run-time mode, the network adapter 14 executes run-time code in a conventional manner, e.g., by forwarding messages received over the network to the host computer 12 and forwarding messages received from the host computer 12 over the network.

Although functions of this illustrative embodiment are illustrated as being software-driven and executable out of memory by the host processor 16 and/or the network adapter processor 24, the presently described functions may alternatively be embodied in part or in whole using hardware components such as custom or semi-custom integrated circuits including ASICs, Programmable Logic Arrays (PLAs), state machines, controllers, or other hardware components or devices, or a combination of hardware components and software.

Those of ordinary skill in the art should further appreciate that variations to and modification of the above-described systems and techniques may be made without departing from the inventive concepts disclosed herein. Accordingly, the present invention should be viewed as limited solely by the scope and spirit of the appended claims.

What is claimed is:

1. A multi-mode network adapter comprising:
   at least one processor;
   at least one memory; and
   at least one program storage configured to store at least a first program, a second program, and a third program,
   wherein said network adapter is operative to load one or more of the programs from the program storage to the memory for subsequent execution by the processor,
   wherein said processor is operative to executer the first program out of said memory in response to a first predetermined condition to test predetermined functions associated with said network adapter,
   wherein said processor is operative to execute the second program out of said memory in response to a second predetermined condition to respond to at least one network message received by said network adapter over a network when a host computer in electrical communication with said network adapter is in a reduced power state in which a host operating system within said host computer is not operational, and
   wherein said processor is operative to execute the third program out of said memory in response to a third predetermined condition to forward messages received over said network to said host computer and to forward messages received from said host computer onto said network.

2. The multi-mode network adapter of claim 1 further including a first plurality of registers for forwarding messages from the processor to the host computer, and a second plurality of registers for receiving messages from the host computer at the processor.

3. The multi-mode network adapter of claim 2 wherein the processor is further operative to download the third program from the host computer to the at least one memory using at least the second plurality of registers.

4. The multi-mode network adapter of claim 1 wherein the processor is further operative to download the third program from the host computer to the at least one memory using a DMA interface included in the host computer.

5. The multi-mode network adapter of claim 1 wherein the processor and the host computer are communicably coupled via a PCI bus.

6. A method of operating a multi-mode network adapter including at least one processor and at least one memory, the method comprising the steps of:
   storing at least a first program, a second program, and a third program in at least one program storage, the program storage being included in the network adapter;
   loading one or more of the programs from the program storage to the memory for subsequent execution by the processor;
   executing the first program out of the memory in response to a first predetermined condition to test predetermined functions associated with the network adapter;

executing the second program out of the memory in response to a second predetermined condition to respond to at least one network message received by the network adapter over a network when a host computer in electrical communication with the network adapter is in a reduced power state in which a host operating system within the host computer is not operational; and executing the third program out of the memory in response to a third predetermined condition to forward messages received over the network to the host computer and to forward messages received from the host computer onto the network.

7. The method of claim 6 further including the steps of, while executing at least the third program, forwarding messages from the processor to the host computer using a first plurality of registers, and receiving messages from the host computer at the processor using a second plurality of registers.

8. The method of claim 7 further including the step of downloading the third program from the host computer to the at least one memory using at least the second plurality of registers.

9. The method of claim 6 further including the step of downloading the third program from the host computer to the at least one memory using a DMA interface included in the host computer.

10. The method of claim 7 further including the step of executing a fourth program out of the at least one memory in response to a fourth predetermined condition to test predetermined functions associated with the first and second pluralities of registers.

11. The method of claim 10 wherein, while testing the predetermined functions associated with the first plurality of registers, receiving messages from the host computer at the processor using the second plurality of registers to confirm test results.

12. The method of claim 10 wherein, while testing the predetermined functions associated with the second plurality of registers, forwarding messages from the processor to the host computer using the first plurality of registers to initialize test conditions.

* * * * *

UNITED STATES PATENT AND TRADEMARK OFFICE
CERTIFICATE OF CORRECTION

PATENT NO.    : 6,694,360 B1
DATED         : February 17, 2004
INVENTOR(S)   : Christopher J. Duguay et al.

It is certified that error appears in the above-identified patent and that said Letters Patent is hereby corrected as shown below:

Column 9,
Line 3, "DRAM or" should read -- DRAM 30 or --;

Column 10,
Line 1, "registers and 6" should read -- registers 5 and 6 --;

Column 12,
Line 63, "ARM to Host" should read -- ARM_to_Host --; and

Column 14,
Line 21, "executer" should read -- execute --.

Signed and Sealed this

Twenty-third Day of November, 2004

JON W. DUDAS
*Director of the United States Patent and Trademark Office*